United States Patent [19]
Mayer

[11] Patent Number: 6,007,059
[45] Date of Patent: Dec. 28, 1999

[54] HYDRAULIC DAMPING BEARING

[75] Inventor: Rudolf Mayer, Ellern, Germany

[73] Assignee: Mannesmann Boge GmbH, Bonn, Germany

[21] Appl. No.: 09/047,811

[22] Filed: Mar. 25, 1998

[30] Foreign Application Priority Data

Mar. 25, 1997 [DE] Germany .......................... 197 12 343

[51] Int. Cl.$^6$ ....................................................... F16F 5/00
[52] U.S. Cl. .................. 267/140.12; 267/226; 29/898.02
[58] Field of Search ............................... 267/140.12, 281, 267/226, 140.11, 140.13, 140.14, 140.15, 140.2, 140.3, 35, 293, 64.28, 141.2; 29/898, 898.02

[56] References Cited

U.S. PATENT DOCUMENTS

| | | | |
|---|---|---|---|
| 3,642,268 | 2/1972 | Hipsher | 267/140.12 X |
| 4,796,875 | 1/1989 | Mertens et al. | 267/140.12 |
| 4,899,997 | 2/1990 | Thorn | 267/140.12 |
| 5,397,112 | 3/1995 | Roth et al. | 267/140.12 |

*Primary Examiner*—Robert J. Oberleitner
*Assistant Examiner*—Pamela J. Lipka
*Attorney, Agent, or Firm*—Cohen, Pontani, Lieberman & Pavane

[57] ABSTRACT

A hydraulic damping bearing comprises an inner part, an outer part arranged at a distance from the inner part, and an elastic element inserted therebetween. At least one chamber filled with a damping medium is arranged between the elastic element and the outer part. The outer part includes at least one bore hole in one of the end regions. The elastic element in this region has a recess communicating with the chamber which is alignable with the bore hole when the elastic element is not fully inserted in the outer part. The bore hole is closed by the elastic element when the elastic element is fully inserted.

9 Claims, 2 Drawing Sheets

HYDRAULIC DAMPING BEARING

BACKGROUND OF THE INVENTION

1. Field of the Invention

The invention is directed to a hydraulic damping bearing comprising an inner part, an outer part arranged at a distance from the inner part, and an elastic element inserted therebetween, in which is arranged at least one chamber filled with a damping medium.

2. Description of the Related Art

Hydraulic damping bearings, which are constructed as hydraulic bushings or as hydraulic engine bearings, comprise an inner part, an outer part, and an elastic member between the inner part and the outer part. A chamber is created by seals on the elastic member between the elastic member and the outer part. The structure of the known bearing makes it difficult to fill this chamber with a damping medium. To assemble the individual parts, the elastic rubber part together with the inner part, is inserted into the outer part in the dry state. Subsequently, a damping medium is introduced into the bearing using a fill hole in the inner part. However, this method requires expensive individual parts because the necessary fill hole is arranged in the inner part. Therefore, additional structural component parts such as balls, etc. are needed to close the fill hole. A further disadvantage of this method is that the risk of damaging the sealing lips of the rubber-metal part during assembly in the dry state is extremely high.

Another method for filling the chambers with a damping medium includes assembling the individual parts in an assembly pan filled with damping liquid, that is, the parts are assembled while submerged below the surface of the damping liquid. This is disadvantageous in that high energy losses occur because the bearings must be washed in warm water after assembly. This leads to environmental loading through the carrying along of the damping liquid after assembly. Moreover, it is disadvantageous that when undercuts, inner stops or duct parts are arranged inside the damping chamber, there is a risk that air will be trapped inside the chamber at the corresponding undercuts, decreasing the desired operability characteristics. Another problem consists in that important structural component parts may get lost in the liquid during assembly. These are usually small parts, e.g., duct parts or internal stops, which have already been mounted on one of the structural component parts or which must be inserted under liquid during assembly.

SUMMARY OF THE INVENTION

The object of the invention is to arrange a hydraulic damping bearing to enable a simple and reliable filling of the bearing with damping medium and to provide a process for performing same.

According to the invention, this object is met in that one of the end regions of the outer part has at least one bore hole. In addition, the elastic element in this region—when the elastic element is not completely assembled—has a recess communicating with the chamber, wherein the bore hole is closed by the elastic element when the elastic element is completely assembled.

After the elastic element is partially inserted, together with the inner part, in the outer part, the interior of the chamber can first be evacuated via the bore hole. After that, the bearing may be filled with damping medium via the same bore hole. The outer region of the elastic element seals the chamber relative to the outer part, while the bore hole can be closed by the elastic element after assembly is complete (i.e., when the elastic member is fully inserted into the outer part).

According to another substantial feature, the elastic element is provided, in every end region, with a seal extending radially outside and along the circumference. The seal is advantageously a component part of the elastic element.

In an advantageous embodiment form, a circumferentially extending elastic region which is arranged radially outside is provided axially between the chamber and the end region to form the recess.

To produce a simple, economical connection between the recess and the chamber, the connection passes through the elastic element or the connection extends within the inner wall of the outer part; further, the connection can also be formed by at least one flattened region of the elastic element.

According to a process for filling the hydraulically damping bearing according to the invention, the elastic element, together with the inner part, is first introduced far enough into the outer part until the bore hole corresponds with the recess, whereupon the damping medium is introduced into the chamber through the bore hole, the recess and the connection. The elastic element is subsequently brought into its fully inserted position in which the bore hole is also closed by the elastic element. Finally, if necessary, the outer part can be reduced; that is, the diameter of the outer part is reduced so that a sizing, a perfect sealing of the end regions, and a pretensioning of the damping medium can be achieved. Of course, it is possible, if required, for the outer part to be reduced in diameter before the introduction of the damping medium in order to achieve a perfect sealing of the end regions.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
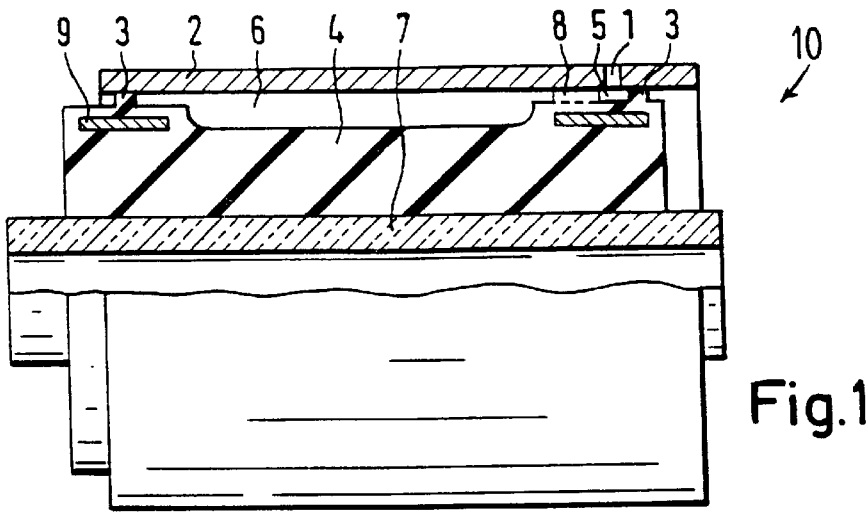
FIG. 1 is a partial sectional view of a bearing in accordance with the invention, in the filling state.

Referring to FIG. 1, a bearing 10 in accordance with the invention comprises an inner part 7, an outer part 2, and an elastic element 4 inserted therebetween. A rubber part can readily be provided as the elastic element 4. The elastic element 4 is fixedly connected with the inner part 7 and both are inserted into an outer part 2 for assembly. In the partially assembled position shown in FIG. 1, a chamber 6 bounded by the outer part 2, and the elastic element 4 is already sealed against the atmosphere by seals 3 of the elastic element 4 in respective end regions of the elastic element 4. For this purpose, a plurality of chambers 6 can be arranged so as to be distributed along the circumference of bearing 10 depending on the design and function of the bearing.

Figure 2:
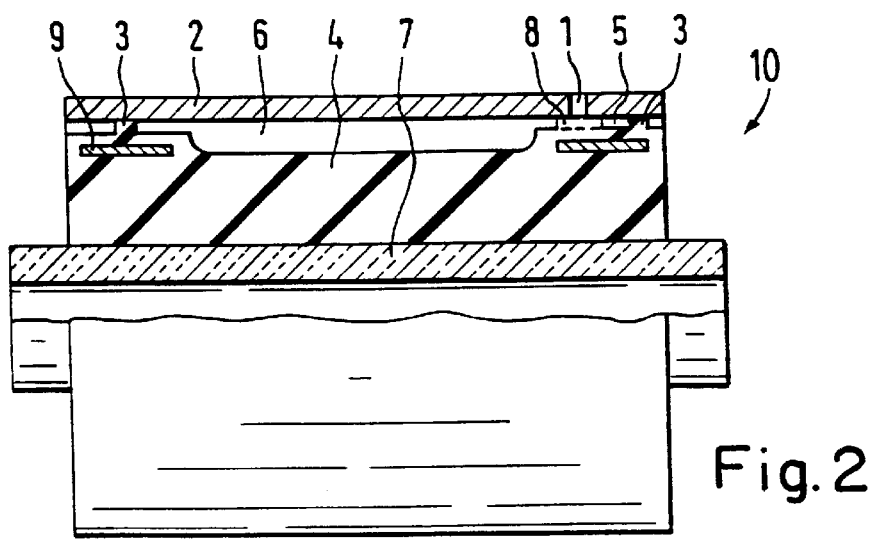
FIG. 2 shows the bearing of FIG. 1 in which a bore hole is closed by an elastic element.

A bore hole 1 through the outer part 2 corresponds to and communicates with the chamber 6 via a recess 5 in one of the seals 3. In the partially assembled position, the interior of the chamber 6 can be evacuated and subsequently filled with damping medium through the bore hole 1. After the filling is completed, the elastic element 4 is inserted axially, together with the inner part 7, into the outer part 2 to the fully inserted position which is shown in FIG. 2.

In FIG. 2, the seals 3 again initially seal the chamber 6 relative to the outer part 2 against the atmosphere. An elastic region 8 contacts the inner end of the bore hole 1 and closes the bore hole 1 preventing the damping medium from escaping from the chamber 6. In a further work step, the outer diameter of the outer part 2 is reduced so that the outer diameter of the bearing 10 is sized on the one hand and the seals 3 as well as the elastic region 8 are pretensioned in such a way that the entire end region of the elastic element 4 comes to rest opposite from the inner wall of the outer part 2. Reinforcing rings 9 ensure the stability of the elastic element 4 in its respective end region. In order to size the outer part 2 or reduce the outer diameter of the outer part 2, the entire bearing is pressed through a tool or die whose inner diameter extends conically, or a radial necking down is used. In so doing, the damping medium is simultaneously pretensioned in the chamber 6.

Figure 4:
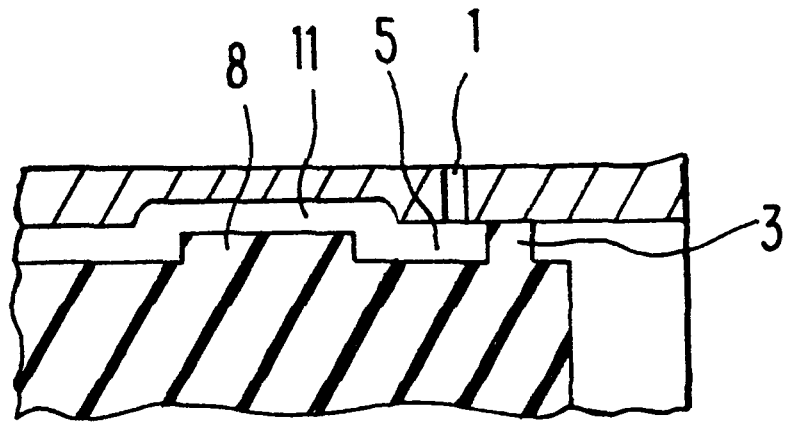
FIG. 4 is an enlarged view of the bore hole and elastic element in a partially inserted position showing another embodiment of the invention.
Figure 5:
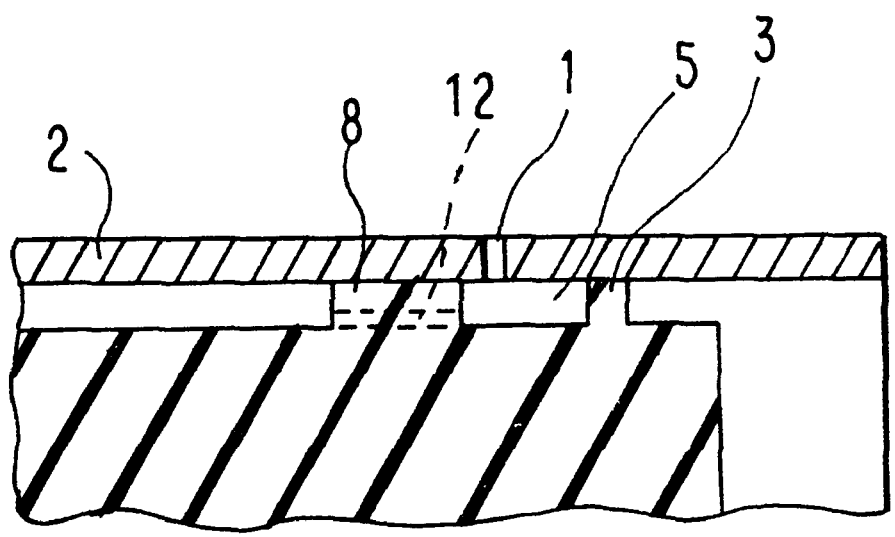
FIG. 5 is an enlarged view of the bore hole and elastic element in a partially inserted position showing yet another embodiment of the invention.

The connection between recess 5 and the chamber 6 is shown as a flattened portion of the elastic element 4 surrounding the elastic region 8. The recess 5 may also be constructed as a duct. FIG. 4 shows an embodiment wherein a duct 11 is a channel along an inner wall of the outer part connecting the recess 5 and the chamber 6. FIG. 5 shows another embodiment wherein a duct 12 connects the recess 5 to the chamber 6 through the elastic region. The connection may be through any other portions of the elastic member 8 or the outer part 2. Instead of one bore hole 1, a plurality of bore holes may be distributed along the circumference of the outer part 2.

Figure 3:
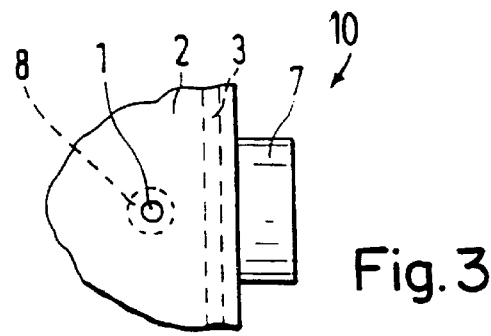
FIG. 3 shows a view of the bore hole for filling.

FIG. 3 shows a top view of bearing 10 in the fully inserted position as a detail in which the bore hole 1 is arranged in the outer part 2. The position of the seal 3, provided along the circumference of the elastic element 4 so that no damping medium can exit when filling the chamber 6, is shown as is the elastic region 8.

The invention is not limited by the embodiments described above which are presented as examples only but can be modified in various ways within the scope of protection defined by the appended patent claims.

I claim:

1. A hydraulic damping bearing, comprising:

an inner part;

an outer part arranged at a distance from the inner part having end regions and having at least one bore hole at one of the end regions; and an elastic element arranged between the inner part and said outer part;

said elastic element comprising seals at end regions of said elastic element operatively arranged for sealingly contacting an inner wall of said outer part and creating at least one chamber between said elastic element and said outer part, said elastic chamber being filled with a damping medium; and said elastic element further comprising a recess in communication with the chamber and alignable with said bore hole on said outer part when said elastic element is in a partially inserted position to thereby allow a filling of the chamber with the damping medium through the bore hole when the elastic element is in the partially inserted position; and said elastic element operatively arranged such that the bore hole is closed by a portion of the elastic element when the elastic element is in a fully inserted position in said outer part.

2. The bearing of claim 1, wherein the seals on said elastic element comprise radially extending seals around the circumference of each of the end regions of the elastic element.

3. The bearing of claim 2, wherein the seals are component parts of the elastic element.

4. The bearing of claim 1, wherein the portion of the elastic element comprises a circumferentially extending elastic region projecting radially from the elastic element and arranged axially between the seals to form the recess of the elastic element.

5. The bearing of claim 1, wherein the recess communicates with the chamber through the elastic element.

6. The bearing of claim 1, wherein the recess communicates with the chamber through an inner wall of the outer part.

7. The bearing of claim 1, wherein the recess communicates with the chamber through a flattened region of the elastic element.

8. A process for filling a hydraulic damping bearing having an inner part, an elastic element, and an outer element, comprising the steps of:

partially inserting the elastic element and the inner part into the outer part such that a bore hole on the outer part corresponds with a recess on the elastic element;

introducing a damping medium into a chamber between the elastic element and the outer part through the bore hole; and fully inserting the elastic element and inner part in the outer part to a fully inserted position whereby the bore hole is closed by the elastic element and the chamber is sealed.

9. The process of claim 8, further comprising the step of reducing a diameter of the outer part to perfect the sealing of the end regions and pretension the damping medium after the step of fully inserting is completed.

* * * * *